United States Patent [19]
Helms et al.

[11] 3,814,893
[45] June 4, 1974

[54] ELECTRODE-FEEDING DEVICE FOR AN ELECTRICAL DISCHARGE MACHINING APPARATUS

[75] Inventors: James K. Helms, King, N.C.; Robert K. Fischer, Azusa, Calif.

[73] Assignee: Westinghouse Electric Corporation, Pittsburgh, Pa.

[22] Filed: Mar. 5, 1973

[21] Appl. No.: 338,132

[52] U.S. Cl. .............................................. 219/69 E
[51] Int. Cl. .............................................. B23k 9/16
[58] Field of Search .... 219/69 E, 69 G, 69 V, 69 M

[56] References Cited
UNITED STATES PATENTS

| | | |
|---|---|---|
| 2,902,584 | 9/1959 | Ullmann .......................... 219/69 E |
| 3,041,442 | 6/1962 | Ullmann et al. ................... 219/69 E |
| 3,614,372 | 10/1971 | Dulebohn ......................... 219/69 E |

*Primary Examiner*—J. V. Truhe
*Assistant Examiner*—Hugh D. Jaeger
*Attorney, Agent, or Firm*—F. J. Baehr, Jr.

[57] ABSTRACT

A reversible servo-motor having a rotatable shaft is mounted on a base plate and an arm is fixed to the shaft to guide an electrical discharge machining electrode along a circular path to form the convex and concave surfaces of two adjacent air foils that make up the nozzles of a nozzle block of a steam turbine.

9 Claims, 5 Drawing Figures

ELECTRODE-FEEDING DEVICE FOR AN ELECTRICAL DISCHARGE MACHINING APPARATUS

BACKGROUND OF THE INVENTION

This invention relates to electrical discharge machining and more particularly to an improvement in the mechanism which feeds the electrode into the workpiece.

To form air foil surfaces in a steam turbine nozzle block utilizing electric discharge machining, it is desirable to guide a curved electrode along an arcuate path. Complex linkages which translate linear motion to rotating motion have been utilized, however, such devices incorporate a plurality of links and pins and the tolerances in each of these elements accumulate so that in order to provide accurate movement each element must be precisely made. To provide relative motion between the elements clearances must be provided, these clearances impede the response of the device, reduce the accuracy of the machining process and make it necessary to operate at lower power inputs which reduces the machining rate.

SUMMARY OF THE INVENTION

In general, an electrical discharge machining apparatus having an electro-feed head capable of moving an electrode rectilinearly in a plurality of directions for machining the nozzles in a nozzle block of a steam turbine, when made in accordance with this invention, comprises a base plate fastened to the electrode-feeding head, a reversible servo-motor having a rotatable shaft, and electrode guiding arm which is fastened to the shaft, and a curved electrode, which is fastened to the guide arms. The electrode is shaped to electrically machine the concave portion of one nozzle blade and the adjacent convex portion of another nozzle blade as the electrode is fed into the nozzle block by the servo-motor and guide arm. The guide arm comprises a first portion fixed to the rotatable shaft and extending therefrom, a second portion disposed generally normal to the first portion and a third portion fastened to the second portion. The third portion is adapted to hold the electrode.

BRIEF DESCRIPTION OF THE DRAWINGS

The objects and advantages of this invention will become more apparent from reading the following detailed description in connection with the accompanying drawings, in which.

DESCRIPTION OF THE PREFERRED EMBODIMENT

Figure 1:
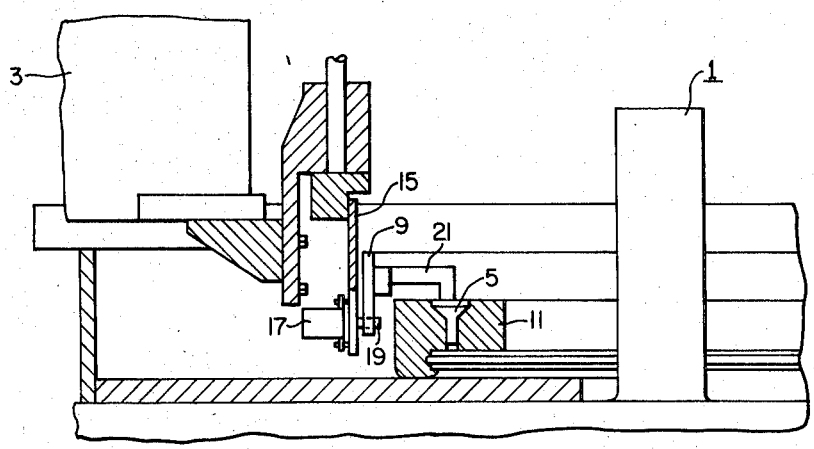
FIG. 1 is an elevational view of a portion of an electrical discharge machining apparatus incorporating an electrode-feeding device made in accordance with this invention.

Referring now to the drawings in detail, FIG. 1 shows a portion of an electrical discharge machining apparatus 1 having an electrode feed head 3 and an electrode 5 made of carbon or other conducting material. The electrode feed head 3 is capable of moving the electrode 5 rectilinearly in a plurality of directions. Fastened to the electrode feed head 3 is an electrode feed guide device 9, which guides the electrode along a circular or arcuate path. Adjacent the electrode 5 is a workpiece or nozzle block 11 into which the electrode 5 penetrates to machine air foil shaped nozzle blades 13. The electrode 5 and nozzle blades 11 are both submerged in a dielectric fluid, such as kerosine, during the machining process.

Figure 2:
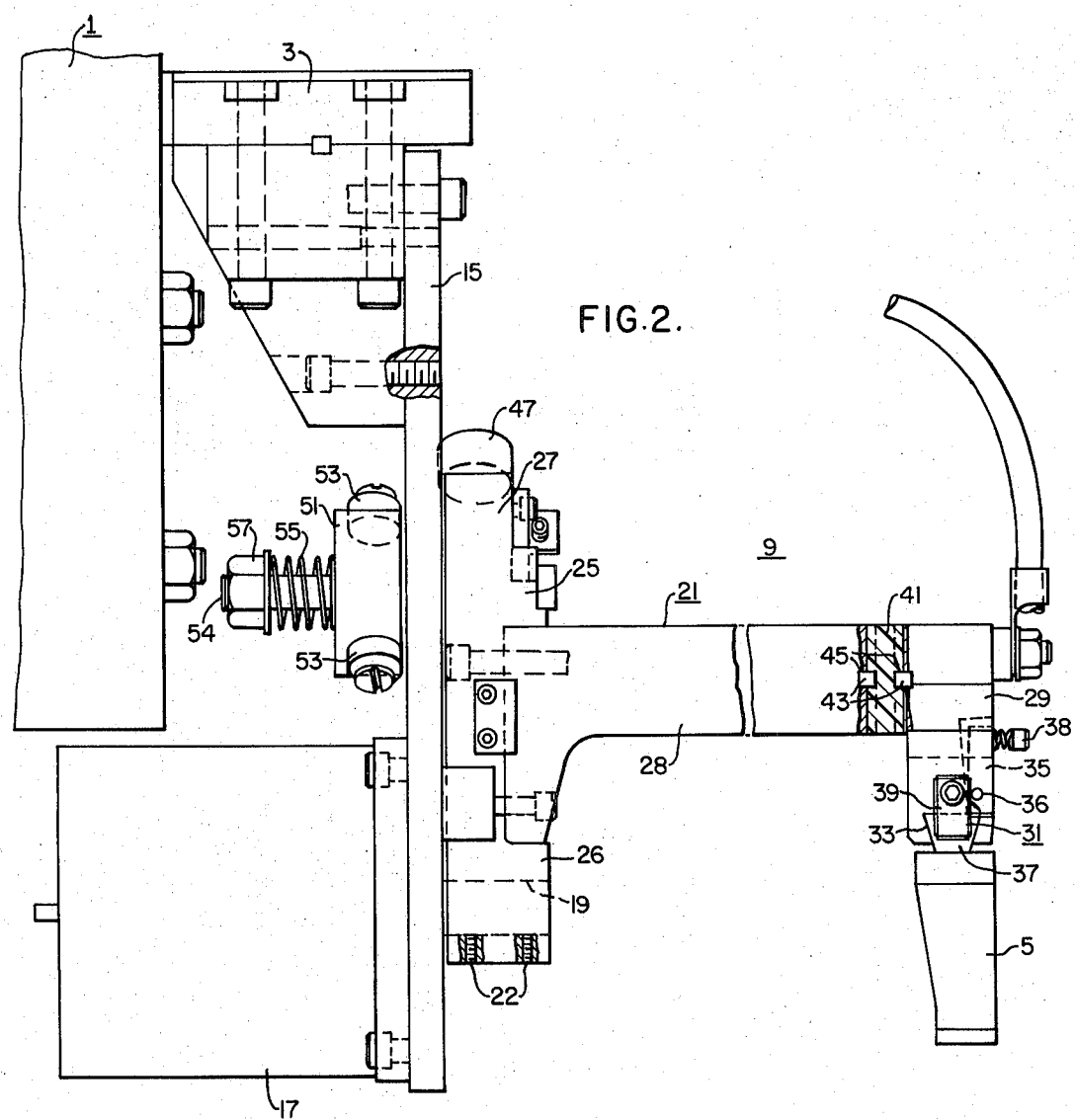
FIG. 2 is an elevational view of the electrode feeding device.
Figure 3:
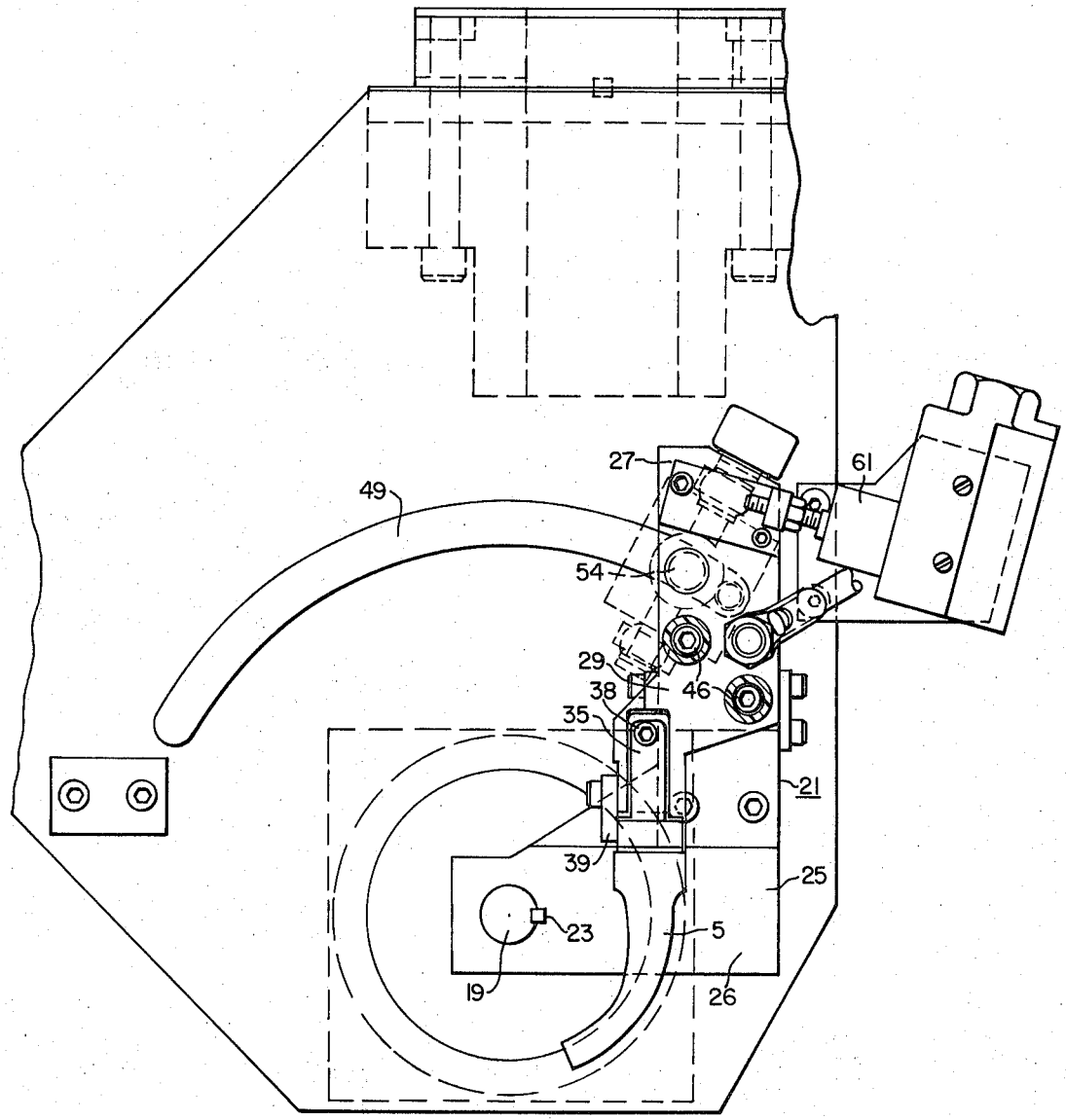
FIG. 3 is a sectional view of the electrode feeding device taken on line III—III of FIG. 2.

As shown best in FIGS. 2 and 3, the electrode feed guide device 9 comprises a base plate 15 fastened to the electrode feeding head 3 and a reversible servo-motor 17 having a rotatable shaft 19. The servo-motor 17 is preferably hydraulicly operated, however electric or other types of servo-motors capable of accurate positioning in response to a positioning signal from a control system (not shown) disposed in the electric discharge machining apparatus 1 will suffice.

An electrode guide arm 21 is fastened to the shaft 19 of the servo-motor 17 by set screws 22, keys and keyways 23, or other means. The electrode guide arm 21 comprises a first portion 25, which fastens to the shaft and extends therefrom. The first portion is generally L-shaped and has a base portion 26 and a shank portion 27. The base portion 26 is fastened to the shaft 17. A second portion 28 extends from the free end of the L-shaped first portion 25 and is disposed generally normal thereto. A third portion 29 is disposed on the end of the second portion 28 and extends generally normal thereto. The third portion 29 has means disposed therein for holding an electrode 31.

The means for holding an electrode 31 comprises a dove-tail shaped groove 33, one side of which is formed by a lever 35 which is pivotally connected to the third portion 29 of the guide arm 21 by a pin 36. The electrode 5 has a dove-tail shaped tongue 37 which fits into the groove 33 and the lever 35 has a set screw 38 which rotates the lever so that it clamps the tongue 37 in the groove 33. A stop 39 is disposed on one end of the groove 33 so as to engage the tongue 37 in order to accurately position the electrode 5.

The third portion 29 of the guide arm 21 is electrically insulated from the second portion 28 of the guide arm 21 by a block 41 made of Micarta or other insulating material. Keys 43 and key ways 45 cooperate with insulated bolts 46 to prevent relative motion between the second and third portions of the guide arm 21.

The first portion 25 of the guide arm 21, as hereinbefore noted, is generally L-shaped and has a cam follower or rolling means 47 disposed on the free end of the shank 27 so as to engage the base plate 15. The base plate 15 has an arcuate shaped elongated opening 49 disposed therein. A carriage 51 having diametrically disposed cam followers or rolling means 53 is disposed on the opposite side of the base plate from the guide arm 21 and a stud 54 functions as fastening means for fastening the carriage 51 to the shank portion 27 of the guide arm. A spring 55 is disposed over the stud 54 and cooperates with a nut 57 to form biasing means which cause the cam followers 47 and 52 to engage the base plate 15 and thus reduces bending moments in the first portion of the guide arm 25 and in the shaft 19 of the servo-motor 17.

A micro-switch 61 is disposed on the base plate 15 adjacent the first portion 25 of the guide arm 21 when the base 26 of the L-shaped first portion 25 of the guide arm 21 approaches one end of its actuate movement providing a signal that the guide arm 21 has reached the end of its travel and that the electrode 5 is completely immersed in the workpiece 11.

Figure 4:
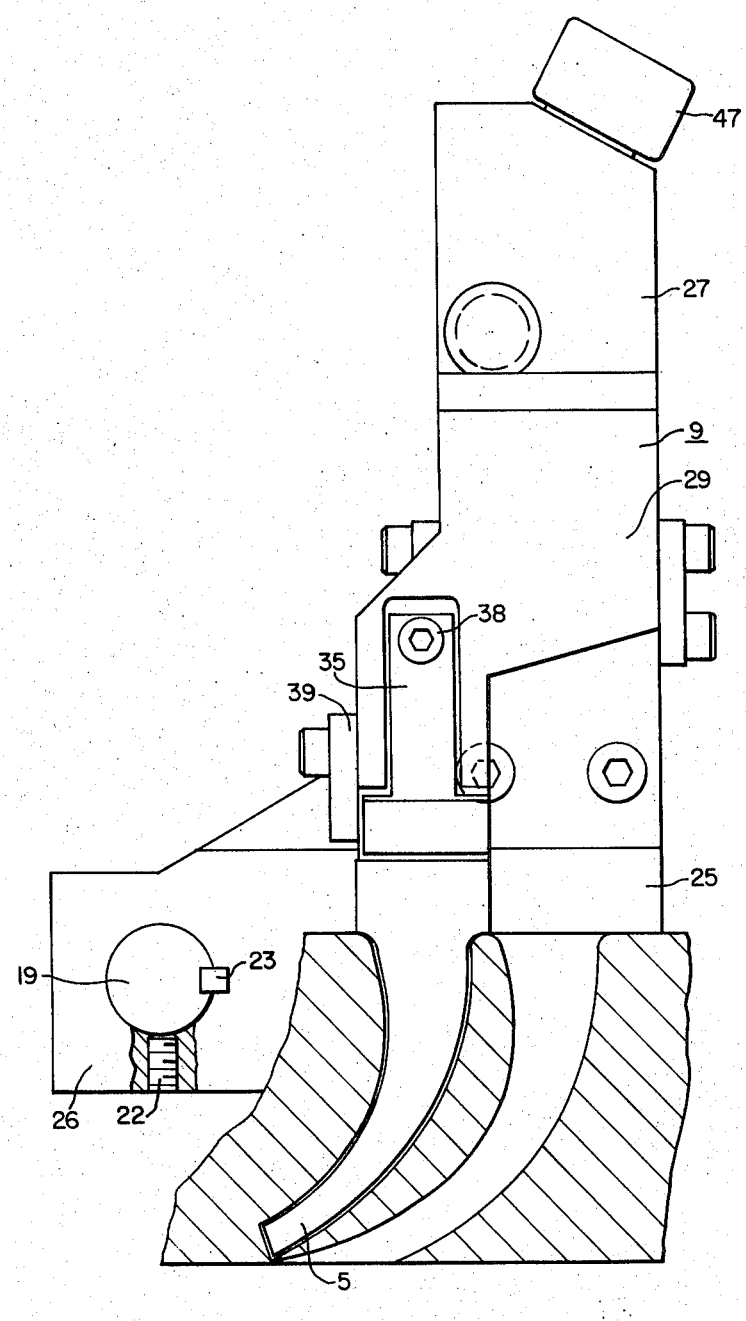
FIG. 4 is a partial elevational view of an electrode and a workpiece.
Figure 5:
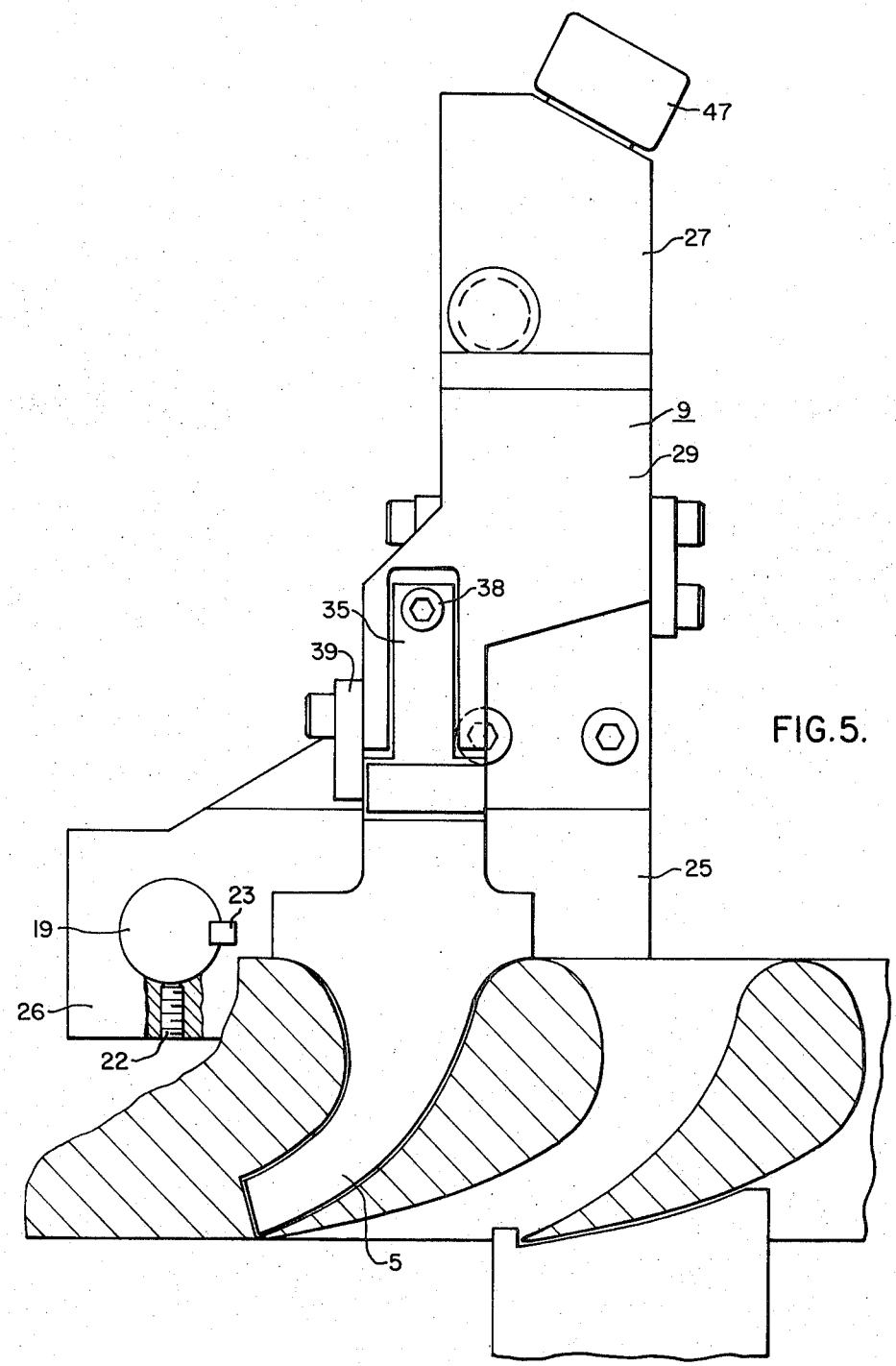
FIG. 5 is a partial elevational view showing an alternative electrode utilized to produce a different shaped air foil.

As shown in FIGS. 4 and 5, the electrode feed guide device 19 may be easily adapted to electrically discharge machine various shaped air foils by changing the shape of the electrode. This is the only change required to electrically discharge machine the various shaped nozzles shown in FIGS. 4 and 5. By changing the radius of the arc through which the electrode travels and by changing the shape of the electrode various other shaped nozzle blades can be machined in a nozzle block. Therefore, the electrode feed guide arm 21, as hereinbefore described, advantageously provides an electrode feed device which can be easily adapted to machine various shaped air foils and it eliminates the links and pins which in include clearances that must be taken up as the drive responds to a signal to move the electrode either into or away from the work, thus producing extremely fast and accurate responses to the positioning control signals, allowing the electrode discharge machine 1 to operate at much higher machining rates.

What is claimed is:

1. An electrical discharge machining apparatus having an electrode feeding head capable of moving an electrode rectilinearly in a plurality of directions for machining the nozzle blades in a nozzle block of a steam turbine, the improvement in said apparatus comprising a base plate fastened to said electrode feeding head; a reversible servo-motor having a rotatable shaft; an electrode guide arm which comprises a first portion fastened to said rotatable shaft, a second portion disposed generally normal to said first portion and a third portion fastened to said second portion, said third portion having means for holding an electrode disposed therein; said base plate having an arcuate shaped elongated hole disposed therein, said first portion of the guide arm having rolling means connected thereto, said rolling means being disposed to engage said base plate; a carriage disposed on the opposite side of said base plate from said guide arms; means extending through said elongated opening to join said carriage to said first portion of said guide arm in order to minimize the bending of said first portion of said guide arm; and a curved electrode, said electrode being shaped to electrically discharge machine the concave portion of one nozzle blade and the adjacent convex portion of another nozzle blade as said electrode is fed into said nozzle block by said electrode guiding arm and said servo-motor.

2. An apparatus as set forth in claim 1, wherein the third portion of the electrode guide arm is electrically insulated from the second portion thereof.

3. Apparatus as set forth in claim 2, wherein the third portion of the electrode guide arm has an electrical cable connected thereto for supplying electrical power to the electrode.

4. Apparatus as set forth in claim 1, wherein the carriage has rolling means disposed thereon, and said rolling means is disposed to engage the base plate.

5. Apparatus as set froth in claim 4, wherein the rolling means disposed on said carriage comprises two diametricly disposed rollers.

6. Apparatus as set forth in claim 5, and further comprising biasing means which acts upon said carriage and said guide arm causing said rolling means to engage said base plate and thereby minimize the bending of said first portion of said guide arm.

7. Apparatus as set forth in claim 1, wherein the servo-motor is a hydraulic motor.

8. Apparatus as set forth in claim 1, wherein said first portion of said guide arm is generally L-shaped.

9. Apparatus as set forth in claim 8, wherein said L-shaped first portion of said guide arm has a base portion and a shank portion, the base portion being fastened to said shaft, and second portion of said guide arm being fastened to said shank portion.

* * * * *